(No Model.)
S. PORTIS.
GATE WORKER.
No. 463,546. Patented Nov. 17, 1891.
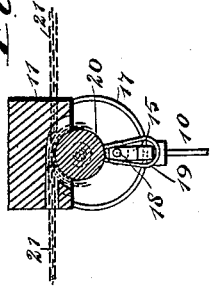
WITNESSES:
F. McArdle
C. Sedgwick
INVENTOR
S. Portis
BY Munn & Co.
ATTORNEYS

UNITED STATES PATENT OFFICE.

SILAS PORTIS, OF MONROVIA, INDIANA, ASSIGNOR OF TWO-THIRDS TO TELEMICHUS N. BENNETT AND ALBERT TAYLOR, BOTH OF SAME PLACE.

GATE-WORKER.

SPECIFICATION forming part of Letters Patent No. 463,546, dated November 17, 1891.

Application filed July 14, 1891. Serial No. 399,510. (No model.)

*To all whom it may concern:*

Be it known that I, SILAS PORTIS, of Monrovia, in the county of Morgan and State of Indiana, have invented a new and Improved Gate-Worker, of which the following is a full, clear, and exact description.

The invention relates to improvements in gate-workers, and is adapted to be used in connection with that class of gates which are arranged to close a carriage-way.

The object of my invention is to produce a simple apparatus which will open and close the gate on the approach and departure of a team, thus obviating the necessity of a gate-tender or of one's getting out of the carriage to operate the gate.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a perspective view of the apparatus as applied to a gate, showing the gate in a closed position. Fig. 2 is a similar view, but with the gate open. Fig. 3 is a sectional plan view of the swing-gate post and the support of the gate. Fig. 4 is a broken front elevation of the latch-gate post, and Fig. 5 is a broken side elevation of the same.

The gate 10 is arranged to swing between the posts 11 and 12. One stile 13 of the gate is pivoted at the bottom on a pintle 14, supported by the swing-post 11. The upper end of the stile 13 is pivoted in an arm 15, which arm is held to slide on a curved rod 17, secured to the upper portion of the gate-post, and the arm 15 has at its outer end an upwardly-extending portion 16, which is embraced by a staple 19, secured to a revoluble drum 20, turning in a recess in the upper part of the post 11. The free end of the arm 15 is arranged within the semicircle formed by the rod 17, and the upper pintle 18 of the stile 13 projects upward through the staple 19, so that when the staple swings it will bear upon the pintle 18 and also upon the upwardly-extending portion 16 of the arm 15. A drum 20 is provided with chains 21, which are secured thereto and which are wound reversely thereon, the ends of the chains extending through a recess to opposite sides of the post 11, and it will be seen that when one chain is pulled the drum 20 will be revolved in one direction and when the opposite chain is pulled the drum will turn in the opposite direction. The chains 21 connect at their free ends with rods 22, and these rods are coupled to other rods 23, the jointed rods being arranged on opposite sides of the gate-post, and each rod 23 is secured at its outer end to a laterally-extending arm 24 on a lever 25, which lever is pivoted on a post 26, arranged alongside the carriage-way and carries at one end a weight 27, which normally holds the arm 24 and the opposite end of the lever in an elevated position, as shown in the drawings.

The upper end of the lever 25 connects by a rod 28 with a crank 29, formed on the end of a rod 30, which rod turns in suitable bearings and extends transversely across a portion of the carriage-way, the rod being doubled near the center to form a crank 31, which is arranged in the path of the wheels of the carriage.

The latch-gate post 12 has a recess 32 extending across its front side—that is, the side next the gate—and this recess is adapted to receive a lug 10ª on the free edge of the gate. The recess 32 has a stop 33 arranged centrally in the lower portion thereof, which stop is adapted to strike against the lug on the gate, and thus limit the movement of the latter.

On opposite sides of the gate-post 12 and adjacent to the recess 32 are latches 34, which swing vertically in keepers 35 and which have laterally-bent ends 36, inclined on the under side, so that as the gate closes the lug 10ª on the gate, striking the inclined portion of the latch, will raise the latter, so as to permit the lug to pass beneath it and enter the recess 32.

On the opposite sides of the swing-gate post 11 and alongside the carriage-way are posts 37, which are placed in relation to the post 11, so that they will engage the free end of the gate when it swings open, and each post 37 has a recess 38 therein to receive the lug on the gate, and each post is also provided with a latch 34 like that described above.

The operation of the gate is as follows: When a team approaches the gate in either direction, the wheel of the vehicle strikes the crank 31, which is held in a raised position by the weight 27 on the lever 25, and the movement of the wheel presses the crank 31 downward and forward, thus turning the crank 29 in a similar way and depressing the lever 25. This movement of the lever pulls on the rods 23 and 22 and on the chain 21, thus turning the drum 20. As the drum turns, the link 19 swings forward, thus carrying with it the pintle 18 and the arm 15, which is secured to the stile of the gate in the manner described, and the outer end of the arm will move faster than the inner end of the arm, and the combined movements of the arm and pintle will swing the upper portion of the stile, so as to raise the free end of the gate and lift the lug $10^a$ over one of the latches 34 and swing the gate open. When the gate opens, the lug $10^a$ engages the latch 34 on one of the posts 37 and the gate is held open until the team passes it. When the wheels of the vehicle strike the crank 31 opposite that which has already been actuated and when the crank is pushed downward, it turns the drum 20 back to its original position by means of the connecting mechanism described above, and this movement closes the gate.

Having thus described my invention, what I claim as new, and desire to secure by Letters Patent, is—

1. The combination, with a post, a gate, and an arm in which the upper end of the gate-stile is pivoted, having a sliding connection with the post, of a drum mounted on the post, a connection between the drum and arm, and ropes or chains wound on the drum, substantially as described.

2. The combination, with a swing-gate post, of a curved rod secured thereto, an arm held to slide on the rod, a gate pivoted at the bottom to the post and at the top to the arm, a revoluble drum mounted in the post and connected with the arm, crank-rods arranged in the roadway adjacent to the gate, and a lever mechanism connecting the crank-rods with the drum, so as to turn the drum by the movements of the rods, substantially as shown and described.

3. The combination, with a post, a gate, and an arm in which the gate-stile is pivoted having a sliding connection with the post, of a drum mounted on the post and connected with the gate, chains wound in opposite directions on the drum, weighted levers pivoted to supports at the side of the roadway and provided with laterally-extending arms, connections between the arms of the said levers and the chains, and crank-rods in the roadway and connected with the weighted levers, substantially as herein shown and described.

4. The combination, with the swing-gate post having a curved rod secured to its upper portion, of the gate pivoted at the bottom to the gate-post, a sliding arm held to slide on the curved rod and forming the pivot for the top of the gate, a drum held to turn horizontally in the gate-post, a staple secured to the drum and embracing the sliding arm, and a lever mechanism for turning the drum, substantially as shown and described.

5. The combination, with the swing-gate post, the latch-gate post having a recess therein and having latches on opposite sides of the latch-post and adjacent to the recess, which latches have laterally-bent outer ends, said ends being inclined on the under side, posts provided with latches and adapted to hold the gate in an open position, and the gate pivoted on the swing-gate post and having a lug to engage the latches, of crank-rods arranged in the roadway on each side of the gate and a lever mechanism for swinging the gate by the movements of the rods, substantially as shown and described.

SILAS PORTIS.

Witnesses:
GEO. I. GEST,
H. W. LINDLEY.